US012067931B2

(12) United States Patent
Choi et al.

(10) Patent No.: US 12,067,931 B2
(45) Date of Patent: Aug. 20, 2024

(54) DISPLAY DEVICE AND METHOD FOR DRIVING THE DISPLAY DEVICE

(71) Applicant: Samsung Display Co., Ltd., Yongin-Si (KR)

(72) Inventors: Hyongdo Choi, Anseong-si (KR); Hyangwon Moon, Yongin-si (KR); Yun-Nam Kim, Suwon-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/116,788

(22) Filed: Mar. 2, 2023

(65) Prior Publication Data

US 2023/0282159 A1 Sep. 7, 2023

(30) Foreign Application Priority Data

Mar. 4, 2022 (KR) ........................ 10-2022-0028134

(51) Int. Cl.
*G09G 3/32* (2016.01)

(52) U.S. Cl.
CPC ....... *G09G 3/32* (2013.01); *G09G 2300/0842* (2013.01); *G09G 2310/027* (2013.01); *G09G 2320/0233* (2013.01); *G09G 2320/0276* (2013.01); *G09G 2320/0673* (2013.01); *G09G 2330/021* (2013.01); *G09G 2330/028* (2013.01)

(58) Field of Classification Search
CPC ............. G09G 3/32; G09G 2300/0842; G09G 2310/027; G09G 2320/0276; G09G 2330/021; G09G 2330/028; G09G 3/3208; G09G 3/3225; G09G 3/3233; G09G 3/3291
See application file for complete search history.

(56) References Cited

U.S. PATENT DOCUMENTS 8,890,779 B2 * 11/2014 Lee ...................... G09G 3/3233 345/77
11,062,649 B2 7/2021 Kim et al.
11,410,613 B2 * 8/2022 Lee ...................... G09G 3/3258
(Continued)

FOREIGN PATENT DOCUMENTS

KR 10-2011-0055303 A 5/2011
KR 10-2015-0075804 A 7/2015
(Continued)

*Primary Examiner* — Mihir K Rayan
(74) *Attorney, Agent, or Firm* — Innovation Counsel LLP

(57) ABSTRACT

Disclosed is a display device including a display panel. The device includes a reference voltage generator, a controller, and a data driver. The controller is configured to receive an input image signal and a dimming value, convert the dimming value into the dimming control signal, and convert the input image signal into image data. The reference voltage generator is configured to receive the dimming control signal and output a correction reference voltage by correcting at least one of a first gamma reference voltage and a second gamma reference voltage based on the dimming control signal. The data driver is configured to receive the correction reference voltage, generate gamma voltages based on the correction reference voltage, convert the image data into data voltages based on the gamma voltages, and output the data voltages to a display panel with pixels.

20 Claims, 13 Drawing Sheets

LUTa

| S_DBV | Vref_H | Vref_L |
|---|---|---|
| 4 nit | Cv_Hp | Cv_Lp |
| 20 nit | Cv_Hp-1 | Cv_Lp-1 |
| 50 nit | Cv_Hp-2 | Cv_Lp-2 |
| ⋮ | ⋮ | ⋮ |
| 250 nit | Cv_H3 | Cv_L3 |
| 400 nit | Cv_H2 | Cv_L2 |
| MHB nit | Cv_H1 | Cv_L1 |

(56) References Cited

U.S. PATENT DOCUMENTS

| | | | | |
|---|---|---|---|---|
| 2006/0087483 | A1* | 4/2006 | Takada | G09G 3/3688 345/89 |
| 2013/0176349 | A1* | 7/2013 | Park | G09G 3/3291 345/690 |
| 2015/0243211 | A1 | 8/2015 | Pyo | |
| 2016/0049113 | A1* | 2/2016 | Park | G09G 3/3208 345/212 |
| 2020/0335042 | A1* | 10/2020 | Son | G09G 3/3291 |
| 2022/0013575 | A1 | 1/2022 | Choi | |
| 2023/0119897 | A1* | 4/2023 | Oh | G09G 3/3275 345/204 |

FOREIGN PATENT DOCUMENTS

| | | | |
|---|---|---|---|
| KR | 10-2020-0082744 | A | 7/2020 |
| KR | 10-2205798 | B1 | 1/2021 |

* cited by examiner

LUTa

| S_DBV | Vref_H | Vref_L |
|---|---|---|
| 4 nit | Cv_Hp | Cv_Lp |
| 20 nit | Cv_Hp-1 | Cv_Lp-1 |
| 50 nit | Cv_Hp-2 | Cv_Lp-2 |
| ⋮ | ⋮ | ⋮ |
| 250 nit | Cv_H3 | Cv_L3 |
| 400 nit | Cv_H2 | Cv_L2 |
| MHB nit | Cv_H1 | Cv_L1 |

< MHB nit >

< 200 nit >

< 50 nit >

DISPLAY DEVICE AND METHOD FOR DRIVING THE DISPLAY DEVICE

CROSS-REFERENCE TO RELATED APPLICATIONS

This application claims priority, under 35 U.S.C. § 119, to Korean Patent Application No. 10-2022-0028134 filed on Mar. 4, 2022 in the Korean Intellectual Property Office, the disclosure of which is incorporated by reference herein in its entirety.

BACKGROUND

The present disclosure relates to a display device and a method for driving the display device, and more particularly, relate to driving a display device with improved display quality.

A display device includes a display panel and a panel driver communicating with a controller. The display panel includes scan lines, data lines, and pixels. The panel driver includes a scan driver that provides scan signals to scan lines, and a data driver that provides data signals to data lines. Each of the pixels may emit light with luminance corresponding to a data voltage provided through the corresponding data line in response to a scan signal provided through the corresponding scan line.

The data driver may convert data voltages having grayscale values by using gamma voltages corresponding to a plurality of grayscales.

SUMMARY

The present disclosure provides a panel driving device for reducing the deterioration of display quality after dimming, and a driving method of a display panel.

According to an aspect, a display device includes a controller, a reference voltage generator, and a data driver. The controller is configured to receive an input image signal and a dimming value, convert the input image signal into image data and the dimming value into a dimming control signal, and to output the dimming control signal. The reference voltage generator is configured to receive the dimming control signal and output a correction reference voltage by correcting at least one of a first gamma reference voltage and a second gamma reference voltage based on a dimming control signal. The data driver is configured to receive the corrected reference voltage and generate gamma voltages based on the correction reference voltage, convert the image data into data voltages based on the gamma voltages, and to output the data voltages. A display panel having pixels receives the data voltages.

In another aspect, a driving method of a display panel includes receiving an input image signal and a dimming value, converting the dimming value into a dimming control signal and converting the input image signal into image data, generating a first gamma reference voltage and a second gamma reference voltage, outputting a correction reference voltage by correcting at least one of the first gamma reference voltage and the second gamma reference voltage based on the dimming control signal, generating gamma voltages based on the correction reference voltage, and converting the image data into data voltages based on the gamma voltages.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
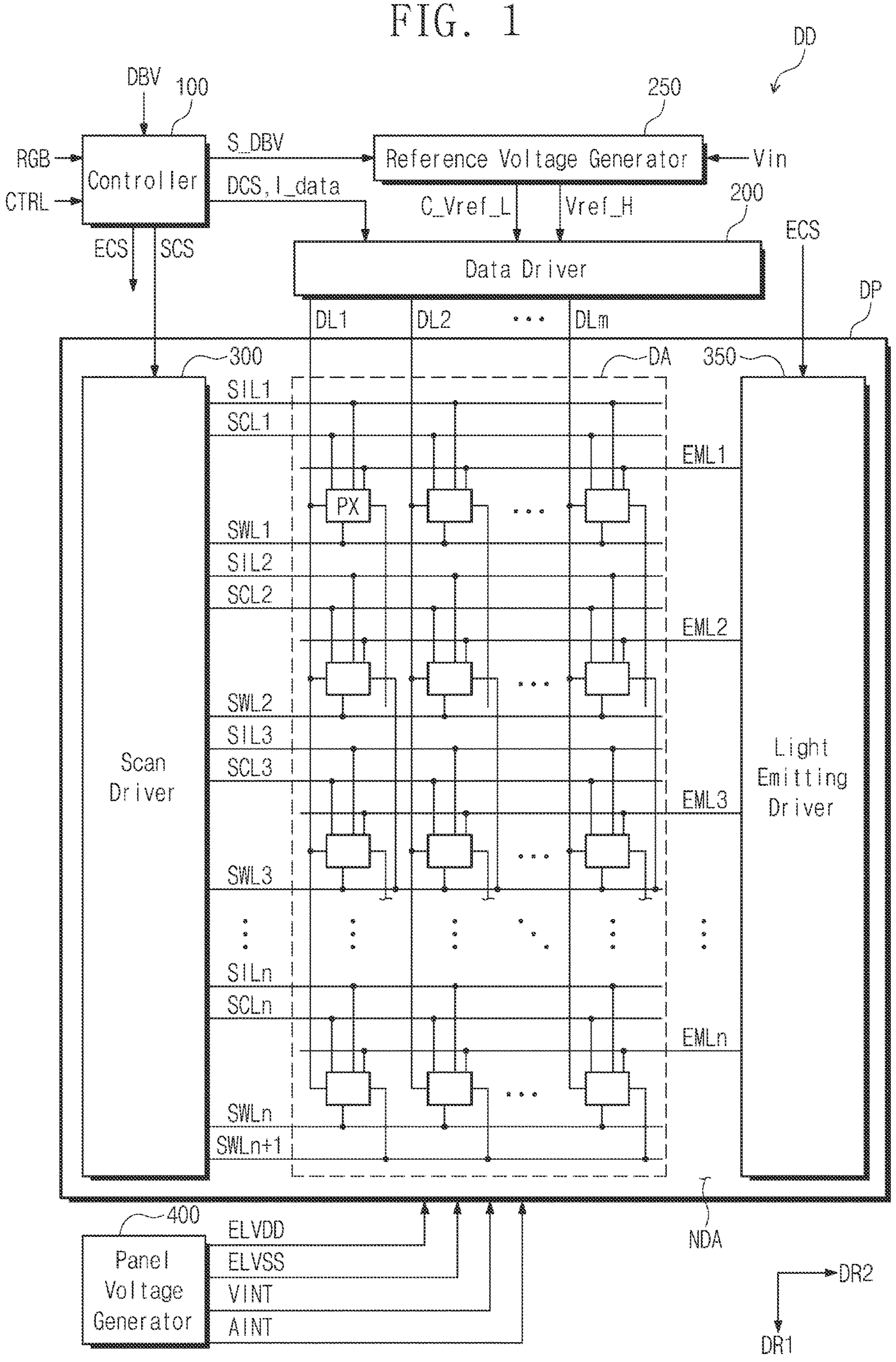
FIG. 1 is a block diagram of a display panel and a driving device, according to an embodiment of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

Figure 2:
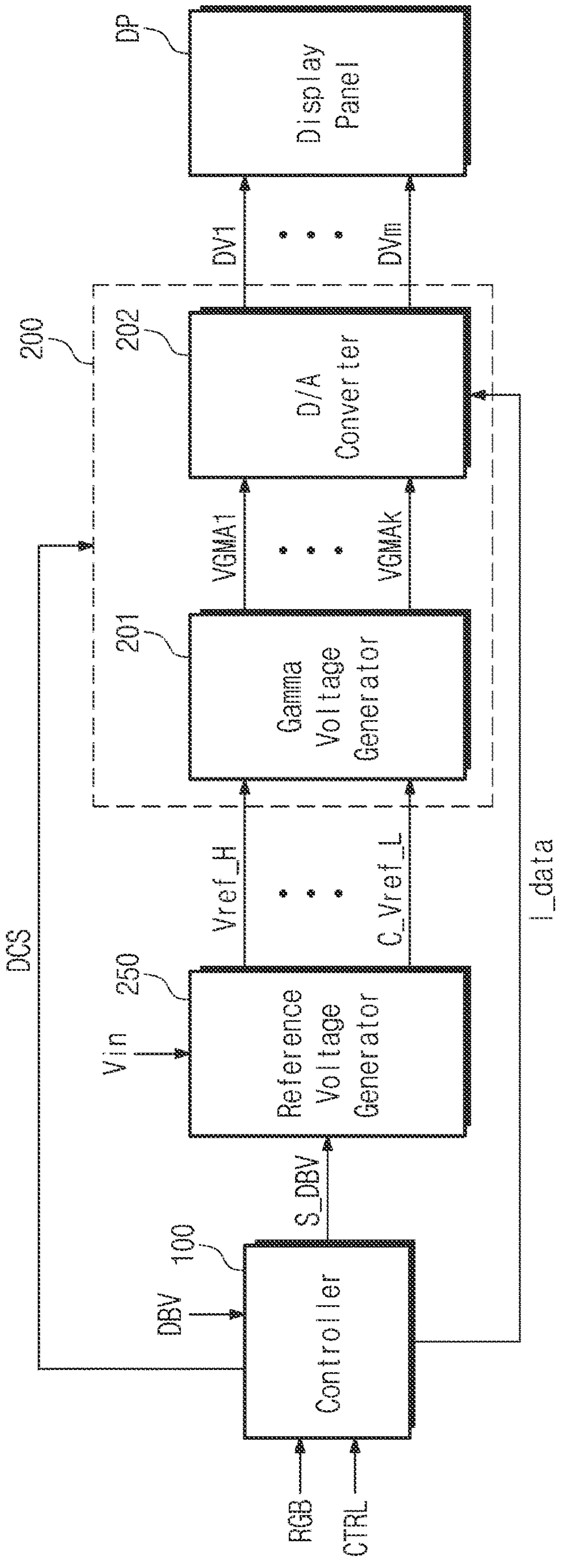
FIG. 2 is a block diagram illustrating a partial configuration shown in FIG. 1.
Figures 3A, 3B:
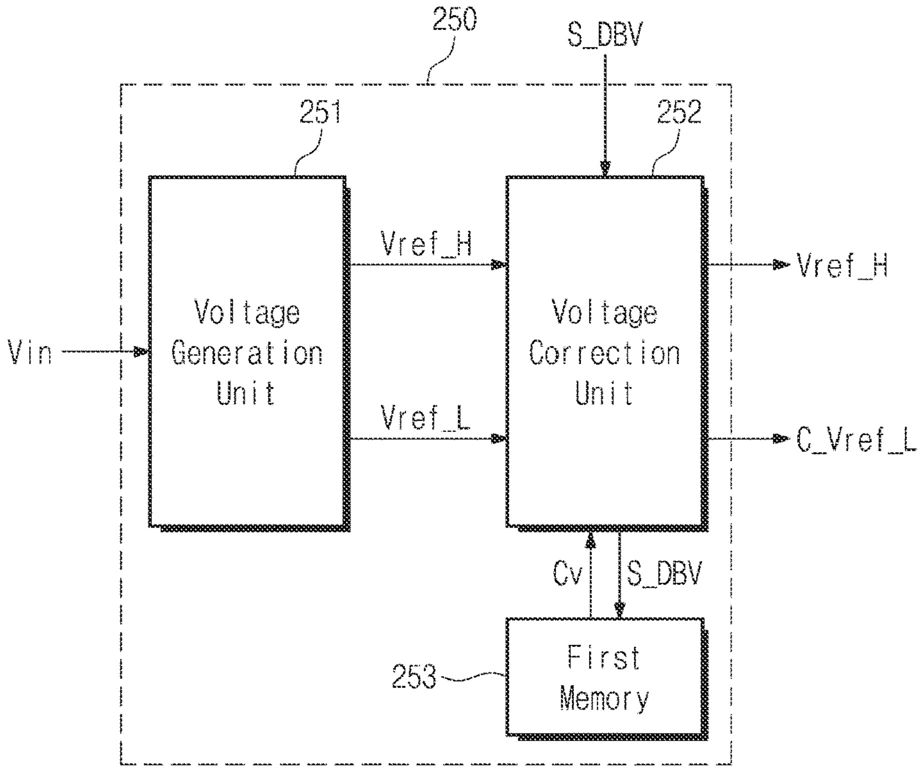
FIG. 3A is an internal block diagram of the reference voltage generator shown in FIG. 2.
FIG. 3B is a diagram illustrating a dimming lookup table, according to an embodiment of the present disclosure.

FIG. 1 is a block diagram of a display panel, a controller, and a panel driver according to an embodiment of the present disclosure. FIG. 2 is a block diagram illustrating a partial configuration shown in FIG. 1. FIG. 3A is an internal block diagram of the reference voltage generator shown in FIG. 2. FIG. 3B is a diagram illustrating a dimming lookup table, according to an embodiment of the present disclosure.

Referring to FIG. 1, a display device DD includes a display panel DP, a panel driver for driving the display panel DP, and a controller 100 for controlling an operation of the panel driver. According to an embodiment of the present disclosure, the panel driver includes a data driver 200, a reference voltage generator 250, a scan driver 300, a light emitting driver 350, and a panel voltage generator 400.

The controller 100 receives an input image signal RGB and a control signal CTRL from the outside (e.g., a host processor). According to an embodiment of the present disclosure, the host processor may be a graphic processing unit (GPU). The input image signal RGB may include a red image signal, a green image signal, and a blue image signal. The controller 100 generates image data I_data by converting a data format of the input image signal RGB in compliance with the specification for an interface with the data driver 200. The controller 100 generates a first driving control signal SCS, a second driving control signal DCS, and a third driving control signal ECS based on the control signal CTRL.

The controller 100 may receive a preset dimming value DBV from the host processor. The dimming value DBV may be a value set so that the display device DD can display an image corresponding to a target luminance level. The dimming value DBV may be one value selected from a plurality of dimming values. The controller 100 generates a dimming control signal S_DBV based on the dimming value DBV. The dimming control signal S_DBV may be a digital signal composed of several bits. The dimming control signal S_DBV may have a digital value that changes depending on the dimming value DBV. For example, where the dimming control signal S_DBV is composed of a 3-bit signal, the dimming control signal S_DBV may have a digital value of 111 when the dimming value DBV has the highest luminance value, and the dimming control signal S_DBV may have a digital value of 000 when the dimming value DBV has the lowest luminance value (e.g., 4 nit). However, the number of bits of the dimming control signal S_DBV is not particularly limited thereto.

Referring to FIGS. 1, 2, and 3A, the reference voltage generator 250 receives the dimming control signal S_DBV from the controller 100. The reference voltage generator 250 includes a voltage generation unit 251, a voltage correction unit 252, and a first memory 253. The voltage generation unit 251 receives an input voltage Vin and generates a gamma reference voltage based on the input voltage Vin. According to an embodiment of the present disclosure, the gamma reference voltage includes a first gamma reference voltage Vref_H and a second gamma reference voltage Vref_L. The first gamma reference voltage Vref_H may have a voltage level higher than the second gamma reference voltage Vref_L. For example, the first gamma reference voltage Vref_H may be about 7 V, and the second gamma reference voltage Vref_L may be about 1 V.

The voltage correction unit 252 receives the first gamma reference voltage Vref_H and the second gamma reference voltage Vref_L from the voltage generation unit 251. The voltage correction unit 252 receives the dimming control signal S_DBV from the controller 100 and corrects at least one of the first gamma reference voltage Vref_H and the second gamma reference voltage Vref_L based on the dimming control signal S_DBV. According to an embodiment of the present disclosure, the voltage correction unit 252 generates a correction reference voltage C_Vref_L by correcting the second gamma reference voltage Vref_L based on the dimming control signal S_DBV. However, the present disclosure is not limited thereto. Alternatively, the voltage correction unit 252 may correct only the first gamma reference voltage Vref_H based on the dimming control signal S_DBV or may correct both the first and second gamma reference voltages Vref_H and Vref_L.

The correction reference voltage C_Vref_L may have a voltage level between the first gamma reference voltage Vref_H and the second gamma reference voltage Vref_L. When the first gamma reference voltage Vref_H is 7 V and the second gamma reference voltage Vref_L is 1 V, the correction reference voltage C_Vref_L may have a voltage level that is greater than or equal to 1 V and is less than 7 V.

A dimming lookup table LUTa may be stored in the first memory 253. Voltage correction values for each level of the dimming control signal S_DBV may be stored in the dimming lookup table LUTa. In FIG. 3B, for convenience of description, the dimming control signal S_DBV is displayed as a luminance value corresponding to the dimming value DBV. However, substantially, the dimming control signal S_DBV may be a digital signal converted from the dimming value DBV. The voltage correction value may include first voltage correction values Cv_H1 to Cv_Hp for correcting the first gamma reference voltage Vref_H and second voltage correction values Cv_L1 to Cv_Lp for correcting the second gamma reference voltage Vref_L.

The voltage correction unit 252 may select a final voltage correction value Cv corresponding to the level of the dimming control signal S_DBV from the dimming lookup table LUTa and may correct the gamma reference voltage by using the final voltage correction value Cv. For example, when the dimming control signal S_DBV has the highest value MHB, the voltage correction unit 252 may select a first high voltage correction value Cv_H1 and/or a first low voltage correction value Cv_L1 as the final voltage correction value Cv. When the dimming control signal S_DBV has a corresponding level of 50 nit, the voltage correction unit 252 may select a (p-2)-th high voltage correction value Cv_Hp-2 and/or a (p-2)-th low voltage correction value Cv_p-2 as the final voltage correction value Cv.

According to an embodiment of the present disclosure, the voltage correction unit 252 may select a second voltage correction value corresponding to the level of the dimming control signal S_DBV from the dimming lookup table LUTa as the final voltage correction value Cv and may generate the correction reference voltage C_Vref_L by correcting the second gamma reference voltage Vref_L by using the second voltage correction value.

Alternatively, when the dimming control signal S_DBV has the highest value MHB, the voltage correction unit 252 may not correct the first and second gamma reference voltages Vref_H and Vref_L. When the voltage correction unit 252 does not correct the first and second gamma reference voltages Vref_H and Vref_L, the first and second gamma reference voltages Vref_H and Vref_L may be output from the reference voltage generator 250.

The data driver 200 receives the second driving control signal DCS and the image data I_data from the controller 100. The data driver 200 includes a gamma voltage generator 201 and a D/A converter 202. The gamma voltage generator 201 receives the first gamma reference voltage Vref_H and the correction reference voltage C_Vref_L from the reference voltage generator 250. The gamma voltage generator 201 generates a plurality of gamma voltages VGMA1 to VGMAk by using the first gamma reference voltage Vref_H and the correction reference voltage C_Vref_L.

The D/A converter 202 receives the plurality of gamma voltages VGMA1 to VGMAk from the gamma voltage generator 201. The D/A converter 202 converts the image data I_data into data voltages DV1 to DVm by using the plurality of gamma voltages VGMA1 to VGMAk. FIG. 2 illustrates that the D/A converter 202 directly receives the image data I_data from the controller 100. However, the present disclosure is not limited thereto. For example, the data driver 200 may further include a shift register interposed between the controller 100 and the D/A converter 202. In this case, the D/A converter 202 may receive the image data I_data through the shift register.

The data driver 200 outputs the data voltages DV1 to DVm converted through the D/A converter 202 to the plurality of data lines DL1 to DLm provided in the display panel DP. The data voltages DV1 to DVm are analog voltages corresponding to grayscale values of the image data I_data. FIG. 2 illustrates that the D/A converter 202 outputs the data voltages DV1 to DVm directly to the display panel DP. However, the present disclosure is not limited thereto. For example, the data driver 200 may further include an output buffer interposed between the D/A converter 202 and the display panel DP. In this case, the data voltages DV1 to DVm converted through the D/A converter 202 may be provided to the output buffer, and the display panel DP may receive the data voltages DV1 to DVm through the output buffer.

The scan driver 300 receives the first driving control signal SCS from the controller 100. The scan driver 300 may output scan signals to scan lines provided in the display panel DP in response to the first driving control signal SCS.

The panel voltage generator 400 generates voltages necessary to operate the display panel DP. In an embodiment, the panel voltage generator 400 generates a first driving voltage ELVDD (or referred to as a "driving voltage"), a second driving voltage ELVSS, a first initialization voltage VINT, and a second initialization voltage AINT.

The display panel DP includes initialization scan lines SIL1 to SILn, compensation scan lines SCL1 to SCLn, write scan lines SWL1 to SWLn+1, emission control lines EML1 to EMLn, data lines DL1 to DLm, and pixels PX. Although not shown in the drawing, the display panel DP may further include black scan lines. The initialization scan lines SIL1 to SILn, the compensation scan lines SCL1 to SCLn, the write scan lines SWL1 to SWLn+1, the emission control lines EML1 to EMLn, the data lines DL1 to DLm, and the pixels PX may be positioned in the display area DA. The data lines DL1 to DLm extend in a first direction DR1 and are arranged spaced from one another in a second direction DR2. The initialization scan lines SIL1 to SILn, the compensation scan lines SCL1 to SCLn, the write scan lines SWL1 to SWLn+1, and the emission control lines EML1 to EMLn extend in the second direction DR2. The initialization scan lines SIL1 to SILn, the compensation scan lines SCL1 to SCLn, the write scan lines SWL1 to SWLn+1, and the emission control lines EML1 to EMLn are arranged spaced from one another in the first direction DR1.

The plurality of pixels PX are electrically connected to the initialization scan lines SIL1 to SILn, the compensation scan lines SCL1 to SCLn, the write scan lines SWL1 to SWLn+1, the emission control lines EML1 to EMLn, and the data lines DL1 to DLm. Each of the plurality of pixels PX may be electrically connected with four scan lines. For example, a first row of pixels may be connected to a first initialization scan line SIL1, a first compensation scan line SCL1, and first and second write scan lines SWL1 and SWL2. Furthermore, a second row of pixels may be connected to a second initialization scan line SIL2, a second compensation scan line SCL2, and the second and third write scan lines SWL2 and SWL3.

The scan driver 300 may be positioned in a non-display area NDA of the display panel DP. In response to the first driving control signal SCS received from the controller 100, the scan driver 300 may output initialization scan signals to the initialization scan lines SIL1 to SILn and may output write scan signals to the write scan lines SWL1 to SWLn+1. Moreover, the scan driver 300 may output compensation scan signals to the compensation scan lines SCL1 to SCLn in response to the first driving control signal SCS.

The light emitting driver 350 receives the third driving control signal ECS from the controller 100. The light emitting driver 350 may output emission control signals to the emission control lines EML1 to EMLn in response to the third driving control signal ECS. In an embodiment, the scan driver 300 may be connected to the emission control lines EML1 to EMLn. In this case, the scan driver 300 may output the emission control signals to the emission control lines EML1 to EMLn.

Each of the plurality of pixels PX includes a light emitting element ED (see FIG. 5) and a pixel circuit unit PXC (see FIG. 5) for controlling the emission of the light emitting element ED. The pixel circuit unit PXC may include a plurality of transistors and a capacitor. The scan driver 300 and the light emitting driver 350 may include transistors formed through the same process as the pixel circuit unit PXC.

Each of the plurality of pixels PX receives the first driving voltage ELVDD, the second driving voltage ELVSS, the first initialization voltage VINT, and the second initialization voltage AINT from the panel voltage generator 400.

Figure 4A:
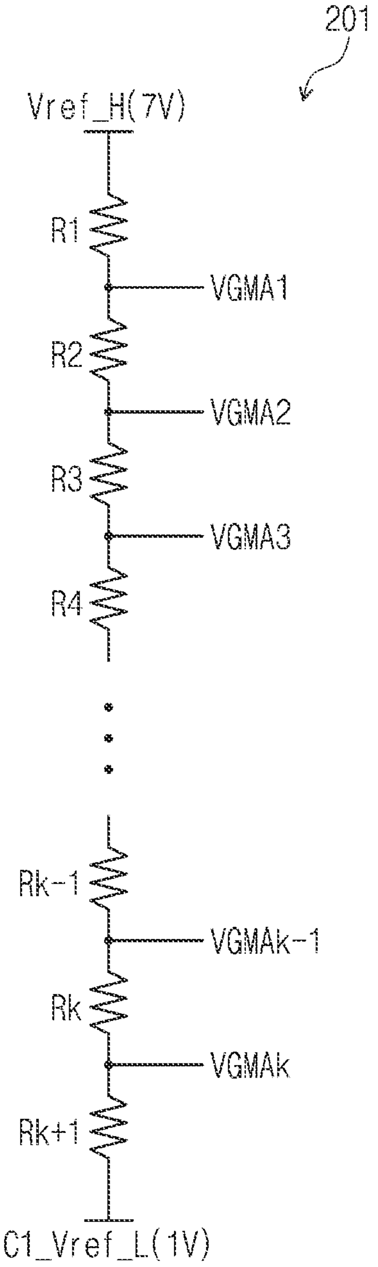
FIGS. 4A to 4C are diagrams illustrating a gamma voltage generator that outputs gamma voltages different depending on a correction reference voltage.
Figure 4B:
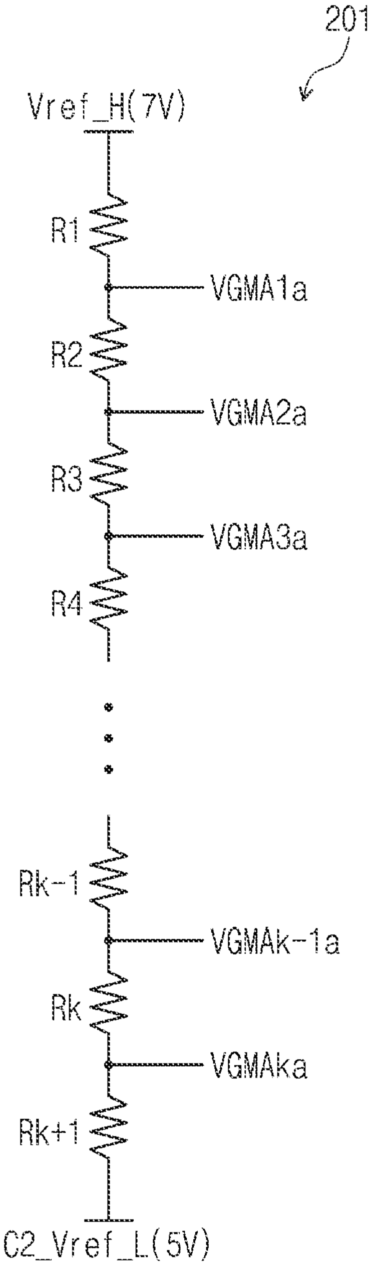
Figure 4C:
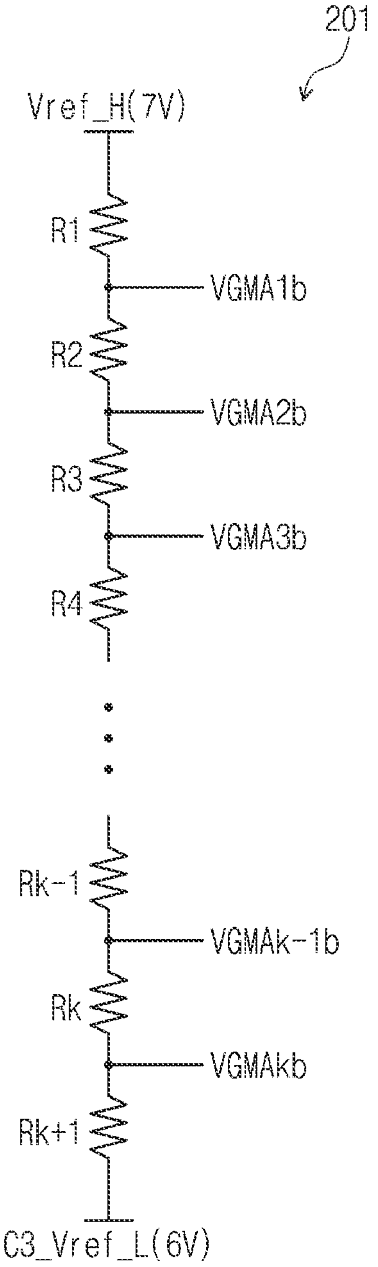

FIGS. 4A to 4C are diagrams illustrating a gamma voltage generator that outputs gamma voltages different depending on a correction reference voltage. When the dimming value DBV has the highest luminance value, FIG. 4A illustrates the first gamma reference voltage Vref_H and a first correction reference voltage C1_Vref_L supplied to the gamma voltage generator 201, and illustrates gamma voltages VGMA1 to VGMAk output from the gamma voltage generator 201. When the dimming value DBV is 200 nit, FIG. 4B illustrates the first gamma reference voltage Vref_H and a second correction reference voltage C2_Vref_L supplied to the gamma voltage generator 201, and illustrates gamma voltages VGMA1*a* to VGMAka output from the gamma voltage generator 201. When the dimming value DBV is 50 nit, FIG. 4C illustrates the first gamma reference voltage Vref_H and a third correction reference voltage C3_Vref_L supplied to the gamma voltage generator 201, and illustrates gamma voltages VGMA1*b* to VGMAkb output from the gamma voltage generator 201.

As shown in FIGS. 2 and 4A, when the dimming value DBV has the highest luminance value MHB nits, the first gamma reference voltage Vref_H and the first correction reference voltage C1_Vref_L may be output from the reference voltage generator 250. In this case, the first gamma reference voltage Vref_H may have a voltage level of 7 V, and the first correction reference voltage C1_Vref_L may have a voltage level of 1 V equal to the second gamma reference voltage Vref_L. That is, the second gamma reference voltage Vref_L may be output as the first correction reference voltage C1_Vref_L without substantial correction. Here, the first gamma reference voltage Vref_H is a voltage for determining a voltage level for the lowest grayscale among grayscales capable of being expressed by using the image data I_data. The first correction reference voltage C1_Vref_L is a voltage for determining a voltage level for the highest grayscale among grayscales capable of being expressed by using the image data I_data.

The gamma voltage generator 201 may include 'k+1' resistors R1 to Rk+1 connected in series between the first gamma reference voltage Vref_H and the first correction reference voltage C1_Vref_L. Here, l' may be determined depending on the number of bits of the image data I_data. For example, when the image data I_data is 8-bit data, 'k' may be 255. The gamma voltage generator 201 may generate the l' gamma voltages VGMA1 to VGMAk based on the first gamma reference voltage Vref_H and the first correction reference voltage C1_Vref_L. Each of the 'k' gamma voltages VGMA1 to VGMAk may have a voltage level between the first gamma reference voltage Vref_H (e.g., 7 V) and the first correction reference voltage C1_Vref_L (e.g., 1 V). According to an embodiment of the present disclosure, a difference between the first gamma reference voltage Vref_H and the first correction reference voltage C1_Vref_L may be approximately 6 V.

As shown in FIGS. 2 and 4B, when the dimming value DBV has a luminance value of 200 nit (e.g., medium luminance), the first gamma reference voltage Vref_H and the second correction reference voltage C2_Vref_L may be output from the reference voltage generator 250. According to an embodiment of the present disclosure, the first gamma reference voltage Vref_H may have a voltage level of 7 V, and the second correction reference voltage C2_Vref_L may have a voltage level of 5 V. Here, the first gamma reference voltage Vref_H is a voltage for determining a voltage level for the lowest grayscale among grayscales capable of being expressed by using the image data I_data. The second correction reference voltage C2_Vref_L is a voltage for determining a voltage level for the highest grayscale among grayscales capable of being expressed by using the image data I_data.

The gamma voltage generator 201 may include 1+1' resistors R1 to Rk+1 connected in series between the first gamma reference voltage Vref_H and the second correction reference voltage C2_Vref_L. That is, even when a difference between the second correction reference voltage C2_Vref_L and the first gamma reference voltage Vref_H decreases to 2 V after the second gamma reference voltage Vref_L is corrected to the second correction reference voltage C2_Vref_L, the number of resistors R1 to Rk+1 positioned between the first gamma reference voltage Vref_H and the second correction reference voltage C2_Vref_L may be maintained as 'k+1'. Accordingly, even when the voltage level of the second correction reference voltage C2_Vref_L increases depending on the dimming value DBV such that the second correction reference voltage C2_Vref_L is greater than the second gamma reference voltage Vref_L, the resolution of the gamma voltage generator 201 may not be reduced. As such, because the resolution of the gamma voltage generator 201 is not reduced, the grayscales may be expressed even at the medium luminance as richly as the highest luminance MHB without grayscale loss.

As shown in FIGS. 2 and 4C, when the dimming value DBV has a luminance value of 50 nit (e.g., low luminance), the first gamma reference voltage Vref_H and the third correction reference voltage C3_Vref_L may be output from the reference voltage generator 250. According to an embodiment of the present disclosure, the first gamma reference voltage Vref_H may have a voltage level of 7 V, and the third correction reference voltage C3_Vref_L may have a voltage level of 6 V. Here, the first gamma reference voltage Vref_H is a voltage for determining a voltage level for the lowest grayscale among grayscales capable of being expressed by using the image data I_data. The third correction reference voltage C3_Vref_L is a voltage for determining a voltage level for the highest grayscale among grayscales capable of being expressed by using the image data I_data.

The gamma voltage generator 201 may include 1+1' resistors R1 to Rk+1 connected in series between the first gamma reference voltage Vref_H and the third correction reference voltage C3_Vref_L. That is, even when a difference between the third correction reference voltage C3_Vref_L and the first gamma reference voltage Vref_H decreases to 1 V after the second gamma reference voltage Vref_L is corrected to the third correction reference voltage C3_Vref_L, the number of resistors R1 to Rk+1 positioned between the first gamma reference voltage Vref_H and the third correction reference voltage C3_Vref_L may be maintained as 1+1'. Accordingly, even when the voltage level of the third correction reference voltage C3_Vref_L increases depending on the dimming value DBV such that the second correction reference voltage C2_Vref_L is greater than the second gamma reference voltage Vref_L, the resolution of the gamma voltage generator 201 may not be reduced. As such, because the resolution of the gamma voltage generator 201 is not reduced, the grayscale may be expressed even at the low luminance as richly as the highest luminance MHB without grayscale loss.

FIGS. 4A to 4C illustrate that the gamma voltage generator 201 includes one gamma string. However, the present disclosure is not limited thereto. For example, the gamma voltage generator 201 may include a gamma string for a red image signal, a gamma string for a green image signal, and a gamma string for a blue image signal. In this case, the reference voltage generator 250 may individually generate the first to third correction reference voltage C1_Vref_L, C2_Vref_L, and C3_Vref_L for a red image signal, the first to third correction reference voltage C1_Vref_L, C2_Vref_L, and C3_Vref_L for a green image signal, and the first to third correction reference voltage C1_Vref_L, C2_Vref_L, and C3_Vref_L for a blue image signal. Furthermore, in correcting the second gamma reference voltages Vref_L to the first to third correction reference voltages C1_Vref_L, C2_Vref_L, and C3_Vref_L, the reference voltage generator 250 may compensate for the second gamma reference voltages Vref_L by using correction values different depending on the red, green and blue image signals.

Figure 5:
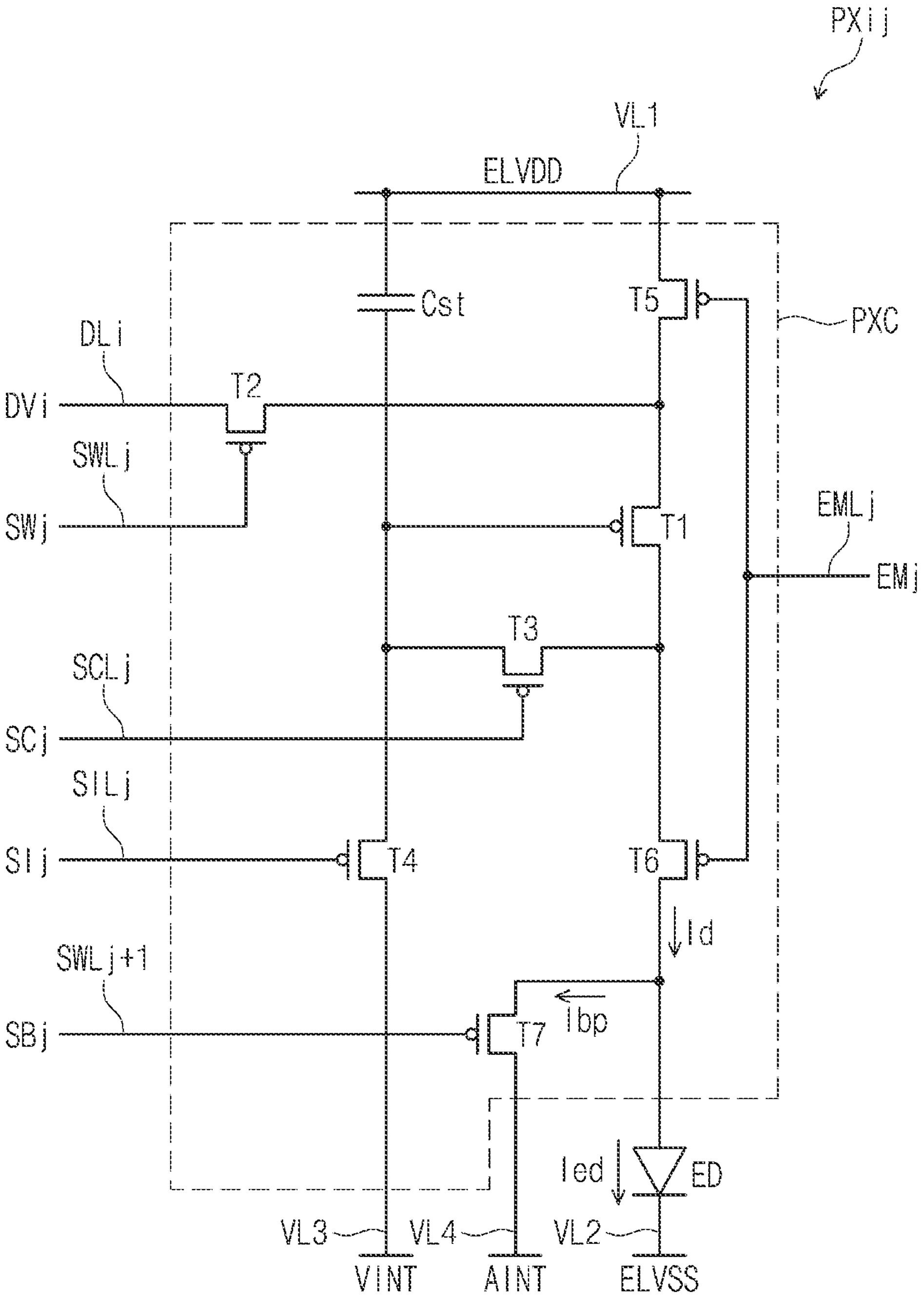
FIG. 5 is a circuit diagram of a pixel, according to an embodiment of the present disclosure.
Figure 6:
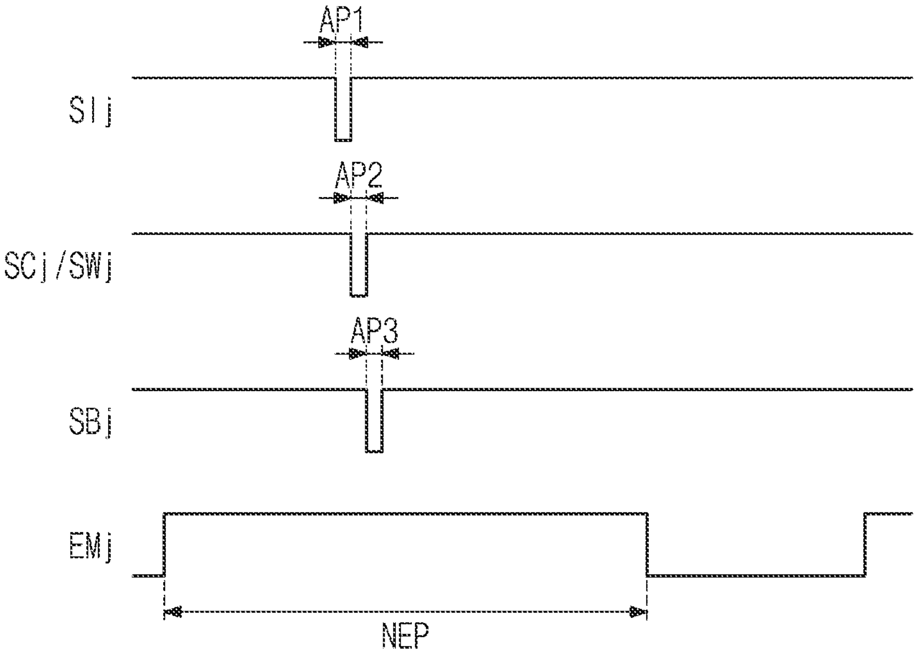
FIG. 6 is a timing diagram for describing an operation of a pixel illustrated in FIG. 5, according to an embodiment of the present disclosure.

FIG. 5 is a circuit diagram of a pixel, according to an embodiment of the present disclosure. FIG. 6 is a timing diagram for describing an operation of a pixel illustrated in FIG. 5, according to an embodiment of the present disclosure.

FIG. 5 illustrates an equivalent circuit diagram of a single pixel PXij among the plurality of pixels PX illustrated in FIG. 1. Below, a circuit structure of the pixel PXij will be described. The plurality of pixels PX have the same structure, and thus, additional description associated with the remaining pixels PX will be omitted to avoid redundancy. The pixel PXij is connected to the i-th data line DLi (hereinafter referred to as a "data line") of the data lines DL1 to DLm and the j-th emission control line EMLj (hereinafter referred to as an "emission control line") among the emission control lines EML1 to EMLn. The pixel PXij is connected to the j-th initialization scan line SILj (hereinafter, referred to as an "initialization scan line") among the initialization scan lines SIL1 to SILn, the j-th write scan line SWLj (hereinafter, referred to as a "first write scan line") and the (j+1)-th write scan line SWLj+1 (hereinafter, referred to as a "second write scan line") among the write scan lines SWL1 to SWLn+1. Moreover, the pixel PXij is connected to the j-th compensation scan line SCLj (hereinafter, referred to as a "compensation scan line") among the compensation scan lines SCL1 to SCLn. Alternatively, the pixel PXij may be connected to a separate j-th black scan line instead of the (j+1)-th write scan line SWLj+1.

The pixel PXij includes the light-emitting element ED and the pixel circuit unit PXC. The light emitting element ED may include a light emitting diode. The light emitting diode may include an organic light emitting material, an inorganic light emitting material, quantum dots, and quantum rods as a light emitting layer.

The pixel circuit unit PXC includes first to seventh transistors T1, T2, T3, T4, T5, T6, and T7 and a single capacitor Cst. Each of the first to seventh transistors T1 to T7 may be a transistor having a low-temperature polycrystalline silicon (LTPS) semiconductor layer. All of the first to seventh transistors T1 to T7 may be P-type transistors. However, a configuration of the pixel circuit unit PXC according to the present disclosure is not limited to an embodiment illustrated in FIG. 5. The pixel circuit unit PXC illustrated in FIG. 5 is only one example, and the configuration of the pixel circuit unit PXC may be modified and carried out. For example, some of the first to seventh transistors T1 to T7 may be P-type transistors, and the others thereof may be N-type transistors. For example, among the first to seventh transistors T1 to T7, the first, second, and fifth to seventh transistors T1, T2, and T5 to T7 are P-type transistors, and the third and fourth transistors T3 and T4 may be N-type transistors by using an oxide semiconductor as a semiconductor layer.

The initialization scan line SILj may transfer the j-th initialization scan signal SIj (hereinafter referred to as an "initialization scan signal") to the pixel PXij; the compensation scan line SCLj may transfer the j-th compensation scan signal SCj (hereinafter referred to as a "compensation scan signal") to the pixel PXij; the first write scan line SWLj may deliver the j-th write scan signal SWj (hereinafter referred to as a "write scan signal") to the pixel PXij; the second write scan line SWLj+1 may transfer the (j+1)-th write scan signal SBj (hereinafter referred to as a "black scan signal") to the pixel PXij; and, the emission control line EMLj may transfer the j-th emission control signal EMj (hereinafter referred to as an "emission control signal") to the pixel PXij. The data line DLi transfers a data voltage DVi to the pixel PXij. The data voltage DVi may have a voltage level corresponding to a grayscale of the corresponding input image signal among the input image signal RGB entered into the display device DD (see FIG. 1). First to fourth driving voltage lines VL1, VL2, VL3, and VL4 may transfer the first driving voltage ELVDD, the second driving voltage ELVSS, the first initialization voltage VINT, and the second initialization voltage AINT to the pixel PXij, respectively.

The first transistor T1 includes a first electrode connected with the first driving voltage line VL1 through the fifth transistor T5, a second electrode electrically connected with an anode of the light emitting element ED through the sixth transistor T6, and a gate electrode connected with a first end of the capacitor Cst. The first transistor T1 may receive the data voltage DVi transferred through the data line DLi depending on the switching operation of the second transistor T2 and then may supply a driving current Id to the light emitting element ED.

The second transistor T2 includes a first electrode connected to the data line DLi, a second electrode connected to the first electrode of the first transistor T1, and a gate electrode connected to the first write scan line SWLj. The second transistor T2 may be turned on in response to the write scan signal SWj received through the first write scan line SWLj and then may transfer the data voltage DVi transferred from the data line DLi to the first electrode of the first transistor T1.

The third transistor T3 includes a first electrode connected to the second electrode of the first transistor T1, a second electrode connected to the gate electrode of the first transistor T1, and a gate electrode connected to the compensation scan line SCLj. The third transistor T3 may be turned on in response to the compensation scan signal SCj received through the compensation scan line SCLj, and thus, the gate electrode and the second electrode of the first transistor T1 may be connected, that is, the first transistor T1 may be diode-connected.

The fourth transistor T4 includes a first electrode connected to the third voltage line VL3 through which the first initialization voltage VINT is transferred, a second electrode connected to the gate electrode of the first transistor T1, and a gate electrode connected to the initialization scan line SILj. The fourth transistor T4 may be turned on in response to the initialization scan signal GIj received through the initialization scan line GILj such that the first initialization voltage VINT is transferred to the gate electrode of the first transistor T1. As such, a voltage of the gate electrode of the first transistor T1 may be initialized. This operation may be referred to as an "an initialization operation".

The fifth transistor T5 includes a first electrode connected to the first driving voltage line VL1, a second electrode connected to the first electrode of the first transistor T1, and a gate electrode connected to the emission control line EMLj.

The sixth transistor T6 includes a first electrode connected to the second electrode of the first transistor T1, a second electrode connected to the anode of the light emitting element ED, and a gate electrode connected to the emission control line EMLj.

The fifth transistor T5 and the sixth transistor T6 are simultaneously turned on in response to the emission control signal EMj received through the emission control line EMLj. The first driving voltage ELVDD applied through the fifth transistor T5 thus turned on may be compensated through the diode-connected first transistor T1 and then may be transferred to the light emitting element ED.

The seventh transistor T7 includes a first electrode connected to the fourth driving voltage line VL4, through which the second initialization voltage AINT is transferred, a second electrode connected to the second electrode of the sixth transistor T6, and a gate electrode connected to the second write scan line SWLj+1.

The first end of the capacitor Cst is connected with the gate electrode of the first transistor T1 as described above, and a second end of the capacitor Cst is connected with the first driving voltage line VL1. A cathode of the light emitting element ED may be connected with the second driving voltage line VL2 that transfers the second driving voltage ELVSS.

Referring to FIGS. 5 and 6, the emission control signal EMj has a high level during a non-emission period NEP. During the non-emission period NEP, the initialization scan signal SIj is activated. During an activation period AP1 (hereinafter, referred to as a "first activation period") of the initialization scan signal SIj, when the initialization scan signal SIj of a low level is provided through the initialization scan line SILj, the fourth transistor T4 is turned on in response to the initialization scan signal SIj of the low level. The first initialization voltage VINT is transferred to the gate electrode of the first transistor T1 through the turned-on fourth transistor T4, and the gate electrode of the first transistor T1 is initialized to the first initialization voltage VINT. Accordingly, the first activation period AP1 may be defined as an initialization period of the pixel PXij.

Then, the compensation scan signal SCj and the write scan signal SWj are activated. The compensation scan signal SCj and the write scan signal SWj may be simultaneously activated during a second activation period AP2. As an example of the present disclosure, the first activation period AP1 may not overlap the second activation period AP2. When the compensation scan signal SCj having a low level is supplied through the compensation scan line SCLj, the third transistor T3 is turned on. The first transistor T1 is diode-connected by the third transistor T3 thus turned on to be forward-biased. During the second activation period AP2, the second transistor T2 is turned on by the write scan signal SWj of the low level. Then, a compensation voltage "DVi-Vth" obtained by reducing the voltage of the data voltage DVi supplied from the data line DLi by the threshold voltage Vth of the first transistor T1 is applied to the gate electrode of the first transistor T1. That is, the potential of the gate electrode of the first transistor T1 may be the compensation voltage "DVi-Vth".

The first driving voltage ELVDD and the compensation voltage "DVi-Vth" may be respectively applied to opposite ends of the capacitor Cst, and charges corresponding to a voltage difference of the opposite ends of the capacitor Cst may be stored in the capacitor Cst. Here, the second activation period AP2 may be referred to as a compensation period or a write period of the pixel PXij.

In the meantime, the black scan signal SBj has a low level during a third activation period AP3. As an example of the present disclosure, the third activation period AP3 may not overlap the second activation period AP2. During the third activation period AP3, the seventh transistor T7 is turned on by receiving the black scan signal SBj of a low level through the second write scan line SWLj+1. A part of the driving current Id may be drained through the seventh transistor T7 as the bypass current Ibp. When the seventh transistor T7 is turned on in response to the black scan signal SBj, the anode may be initialized to the second initialization voltage AINT.

In the case where the pixel PXij displays a black image, when the light emitting element ED emits light even though the minimum driving current of the first transistor T1 flows as the driving current Id, the pixel PXij may not normally display a black image. Accordingly, the seventh transistor T7 in the pixel PXij according to an embodiment of the present disclosure may drain (or disperse) a part of the minimum driving current of the first transistor T1 to a current path, which is different from a current path to the light emitting element ED, as the bypass current Ibp. Here, the minimum driving current of the first transistor T1 means the current flowing into the first transistor T1 under the condition that the first transistor T1 is turned off because the gate-source voltage Vgs of the first transistor T1 is less than the threshold voltage Vth. As the minimum driving current (e.g., a current of 10 pA or less) flowing to the first transistor T1 is transferred to the light emitting element ED under the condition that the first transistor T1 is turned off, an image of a black gray scale is displayed. When the pixel PXij displays a black image, the bypass current Ibp has a relatively large influence on the minimum driving current. On the other hand, when the pixel PXij displays an image such as a normal image or a white image, the bypass current Ibp has little effect on the driving current Id. Accordingly, when a black image is displayed, a current (i.e., the light emitting current Ted) that corresponds to a result of subtracting the bypass current Ibp flowing through the seventh transistor T7 from the driving current Id is provided to the light emitting element ED, and thus a black image may be clearly displayed. Accordingly, the pixel PXij may implement an accurate black grayscale image by using the seventh transistor T7, and thus a contrast ratio may be improved.

Next, the emission control signal EMj supplied from the emission control line EMLj is changed from a high level to a low level. The fifth transistor T5 and the sixth transistor T6 are turned on by the emission control signal EMj having a low level. In this case, the driving current Id according to a voltage difference between the voltage of the gate electrode of the first transistor T1 and the first driving voltage ELVDD is generated and supplied to the light emitting element ED through the sixth transistor T6, and the current Ied flows through the light emitting element ED.

Figure 7:
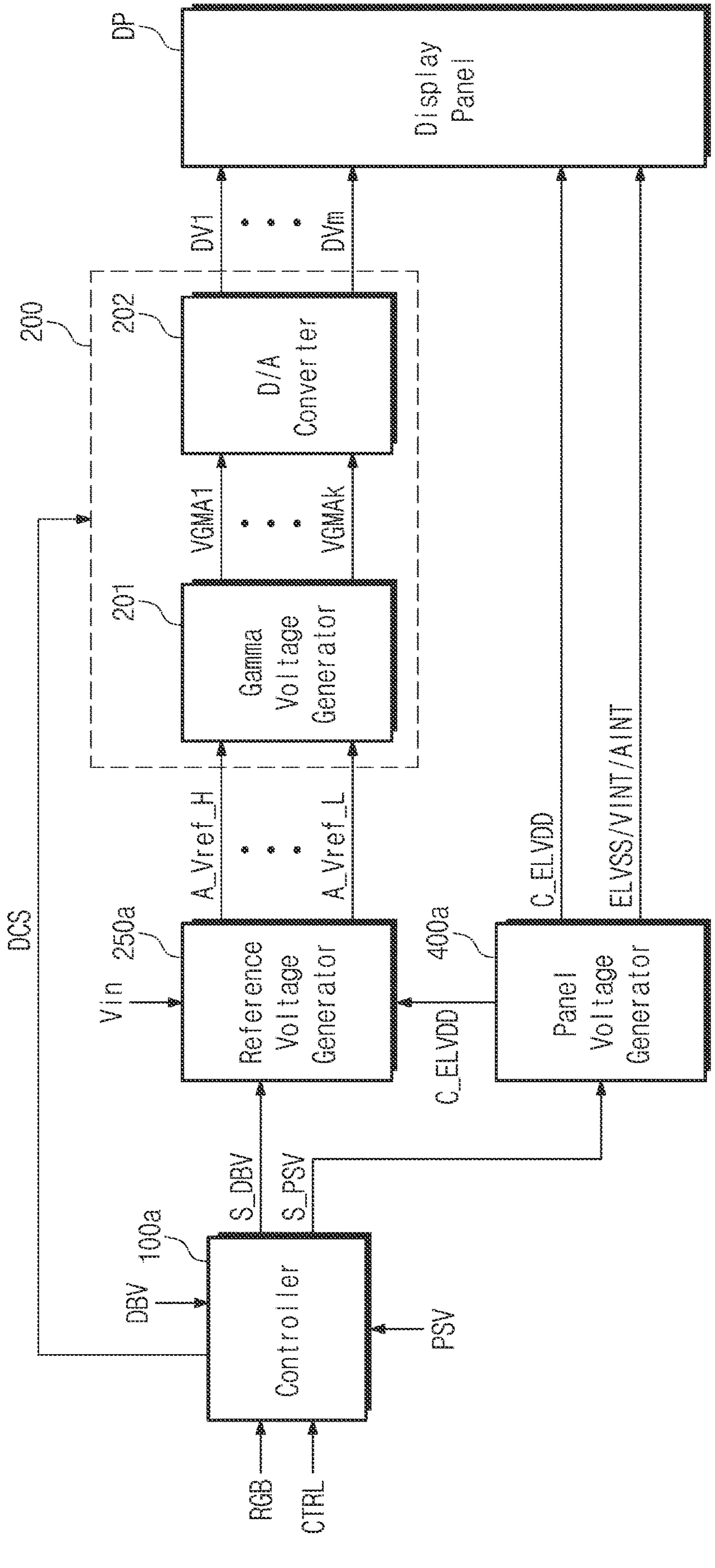
FIG. 7 is a block diagram illustrating a partial configuration of a display device, according to an embodiment of the present disclosure.
Figure 8:
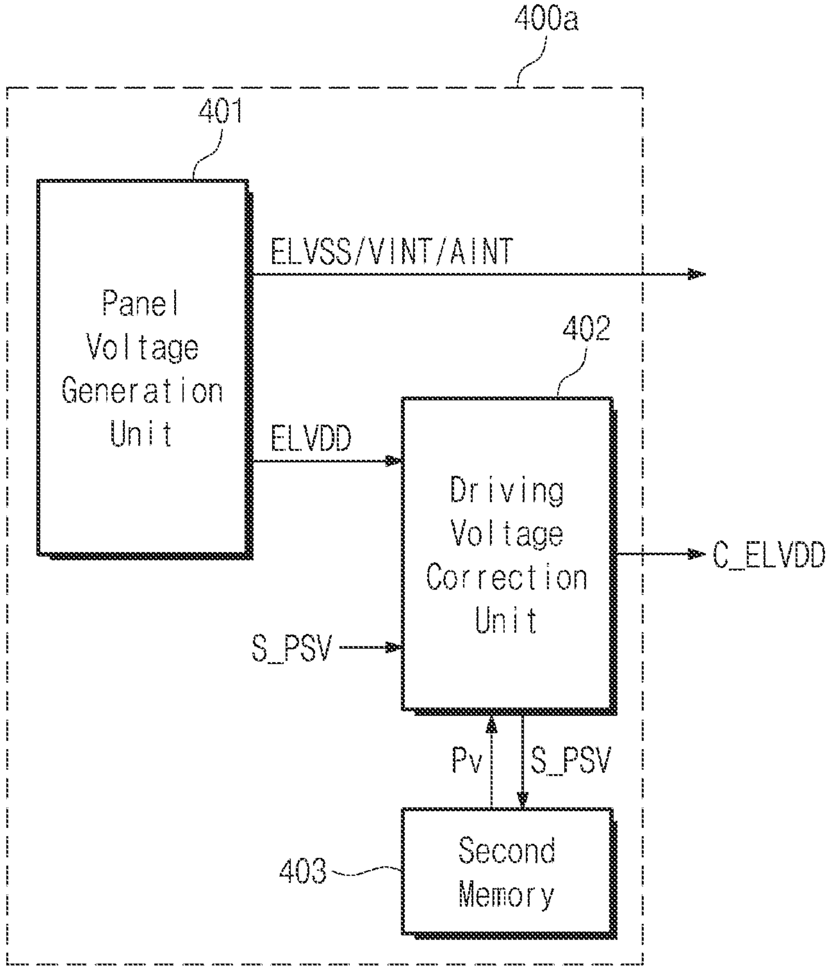
FIG. 8 is an internal block diagram of the panel voltage generator shown in FIG. 7.
Figure 9:
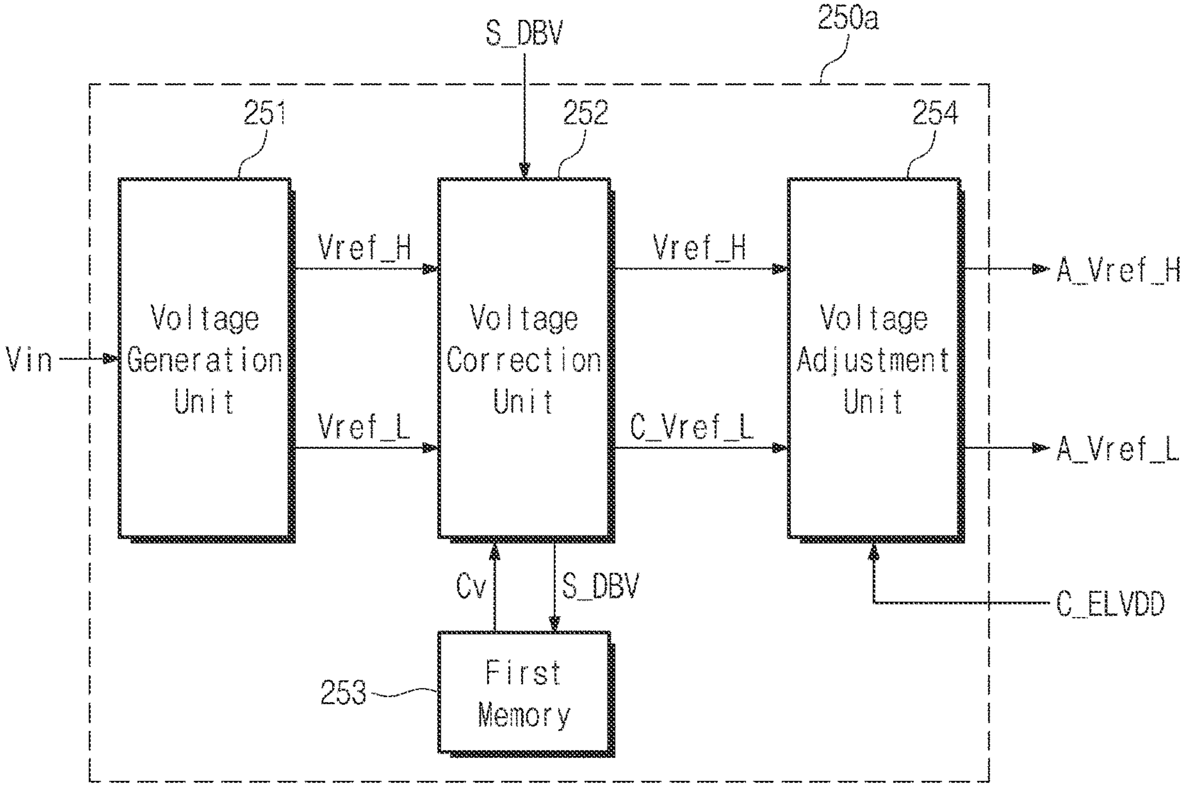
FIG. 9 is an internal block diagram of the reference voltage generator shown in FIG. 7.

FIG. 7 is a block diagram illustrating a partial configuration of a display device, according to an embodiment of the present disclosure. FIG. 8 is an internal block diagram of the panel voltage generator shown in FIG. 7. FIG. 9 is an internal block diagram of the reference voltage generator shown in FIG. 7. Components, which are equal to the components illustrated in FIGS. 2 and 3A, from among components illustrated in FIGS. 7 and 9 are marked by the same reference signs, and thus, additional description will be omitted to avoid redundancy.

Referring to FIG. 7, a controller 100*a* may receive a predetermined power saving signal PSV from a host processor. The power saving signal PSV may be a value set such that the display device DD is capable of displaying an image with the target power. The power saving signal PSV may be one signal selected from a plurality of power saving signals. The controller 100*a* generates a power control signal S_PSV based on the power saving signal PSV. The power control signal S_PSV may be a digital signal composed of several bits. The power control signal S_PSV may have a digital value different depending on the level of the power saving signal PSV. For example, in the case where the power control signal S_PSV is composed of a 2-bit signal, the power control signal S_PSV may have a digital value of 11 when the power saving signal PSV has the maximum power value, or the power control signal S_PSV may have a digital value of 00 when the power saving signal PSV has the lowest power value. However, the number of bits of the power control signal S_PSV is not particularly limited thereto.

Referring to FIGS. 7 and 8, a panel voltage generator 400*a* receives the power control signal S_PSV from the controller 100*a*. The panel voltage generator 400*a* includes a panel voltage generation unit 401, a driving voltage correction unit 402 and a second memory 403. The panel voltage generation unit 401 may generate voltages, which are required to drive the display panel DP, for example, the first and second driving voltages ELVDD and ELVSS, and the first and second initialization voltages VINT and AINT. According to an embodiment of the present disclosure, the first driving voltage ELVDD may be about 5 V, and the second driving voltage ELVSS may be about −2.5 V. Each of the first and second initialization voltages VINT and AINT may have a lower voltage level than the second driving voltage ELVSS.

The second driving voltage ELVSS and the first and second initialization voltages VINT and AINT generated from the panel voltage generation unit 401 may be supplied to the display panel DP. According to an embodiment of the present disclosure, the first driving voltage ELVDD may be supplied to the driving voltage correction unit 402. The driving voltage correction unit 402 receives the power control signal S_PSV from the controller 100*a*, and corrects the first driving voltage ELVDD based on the power control signal S_PSV.

A power lookup table may be stored in the second memory 403. Power correction values Pv for each level of the power control signal S_PSV may be stored in the power lookup table. The driving voltage correction unit 402 may select a power correction value Pv corresponding to a level of the power control signal S_PSV from the power lookup table and may correct the first driving voltage ELVDD by using the selected power correction value Pv. Hereinafter, the corrected first driving voltage ELVDD is referred to as a "correction driving voltage C_ELVDD".

The correction driving voltage C_ELVDD generated from the driving voltage correction unit 402 may be provided to the display panel DP. When the power control signal S_PSV has the highest level, the first driving voltage ELVDD may not be corrected substantially. That is, the correction driving voltage C_ELVDD may have the same voltage level as the first driving voltage ELVDD. In the meantime, when the power control signal S_PSV has a level smaller than the maximum level, the driving voltage correction unit 402 may generate the correction driving voltage C_ELVDD by decreasing the voltage level of the first driving voltage ELVDD by the power correction value Pv.

The driving voltage correction unit 402 may provide the correction driving voltage C_ELVDD to a reference voltage generator 250*a*. As such, power consumed by the display device DD (see FIG. 1) may be reduced by correcting the first driving voltage ELVDD depending on the power saving signal PSV.

The corrected driving voltage C_ELVDD corrected from the first driving voltage ELVDD may be supplied to the pixel circuit unit PXC as shown in FIG. 5 instead of the first driving voltage ELVDD. In this case, even when the correction driving voltage C_ELVDD is supplied to the pixel circuit unit PXC, the relationship that a potential Vs of the first electrode of the first transistor T1 is greater than a potential Vg of the gate electrode of the first transistor T1 needs to be established for the normal operation of the pixel circuit unit PXC. Accordingly, when the first driving voltage ELVDD is corrected to the correction driving voltage C_ELVDD, the data voltages DV1 to DVm needs to be varied depending on the correction driving voltage C_ELVDD. To change the data voltages DV1 to DVm, the first gamma reference voltage Vref_H and the correction reference voltage C_Vref_L supplied to the gamma voltage generator 201 need to be changed in conjunction with the correction driving voltage C_ELVDD.

Referring to FIGS. 7 and 9, the reference voltage generator 250*a* may include the voltage generation unit 251, the voltage correction unit 252, the first memory 253, and a voltage adjustment unit 254.

The voltage adjustment unit 254 receives the first gamma reference voltage Vref_H and the correction reference voltage C_Vref_L from the voltage correction unit 252 and receives the correction driving voltage C_ELVDD from the panel voltage generator 400*a*. The voltage adjustment unit 254 adjusts voltage levels of the first gamma reference voltage Vref_H and the correction reference voltage C_Vref_L based on the correction driving voltage C_ELVDD.

For example, when the correction driving voltage C_ELVDD has about 3 V that is reduced lower than the first driving voltage ELVDD by about 2 V, the first gamma reference voltage Vref_H of about 7 V and the correction reference voltage C_Vref_L of about 5 V may be input to the voltage adjustment unit 254. In this case, the voltage adjustment unit 254 may adjust the first gamma reference voltage Vref_H and the correction reference voltage C_Vref_L by a difference (e.g., 2 V) between the correction driving voltage C_ELVDD and the first driving voltage ELVDD. That is, the voltage adjustment unit 254 may generate a first adjustment reference voltage A_Vref_H by decreasing the first gamma reference voltage Vref_H by a first adjustment value and may generate a second adjustment reference voltage A_Vref_L by decreasing the correction reference voltage C_Vref_L by a second adjustment value. According to an embodiment of the present disclosure, the first and second adjustment values may have the same level as each other. For example, each of the first and second adjustment values may have a level corresponding to the difference between the correction driving voltage C_ELVDD and the first driving voltage ELVDD.

When the voltage adjustment unit 254 receives the first and second gamma reference voltages Vref_H and Vref_L from the voltage correction unit 252, the voltage adjustment unit 254 may generate the first and second adjustment reference voltages A_Vref_H and A_Vref_L by decreasing the first and second gamma reference voltages Vref_H and Vref_L by the difference, respectively.

As such, even in a structure for reducing power consumption of the display device DD, dimming may be performed without loss of grayscale through correction of the first and second gamma reference voltages Vref_H and Vref_L, by adjusting the first gamma reference voltage Vref_H and the correction reference voltage C_Vref_L depending on the correction driving voltage C_ELVDD.

Figure 10:
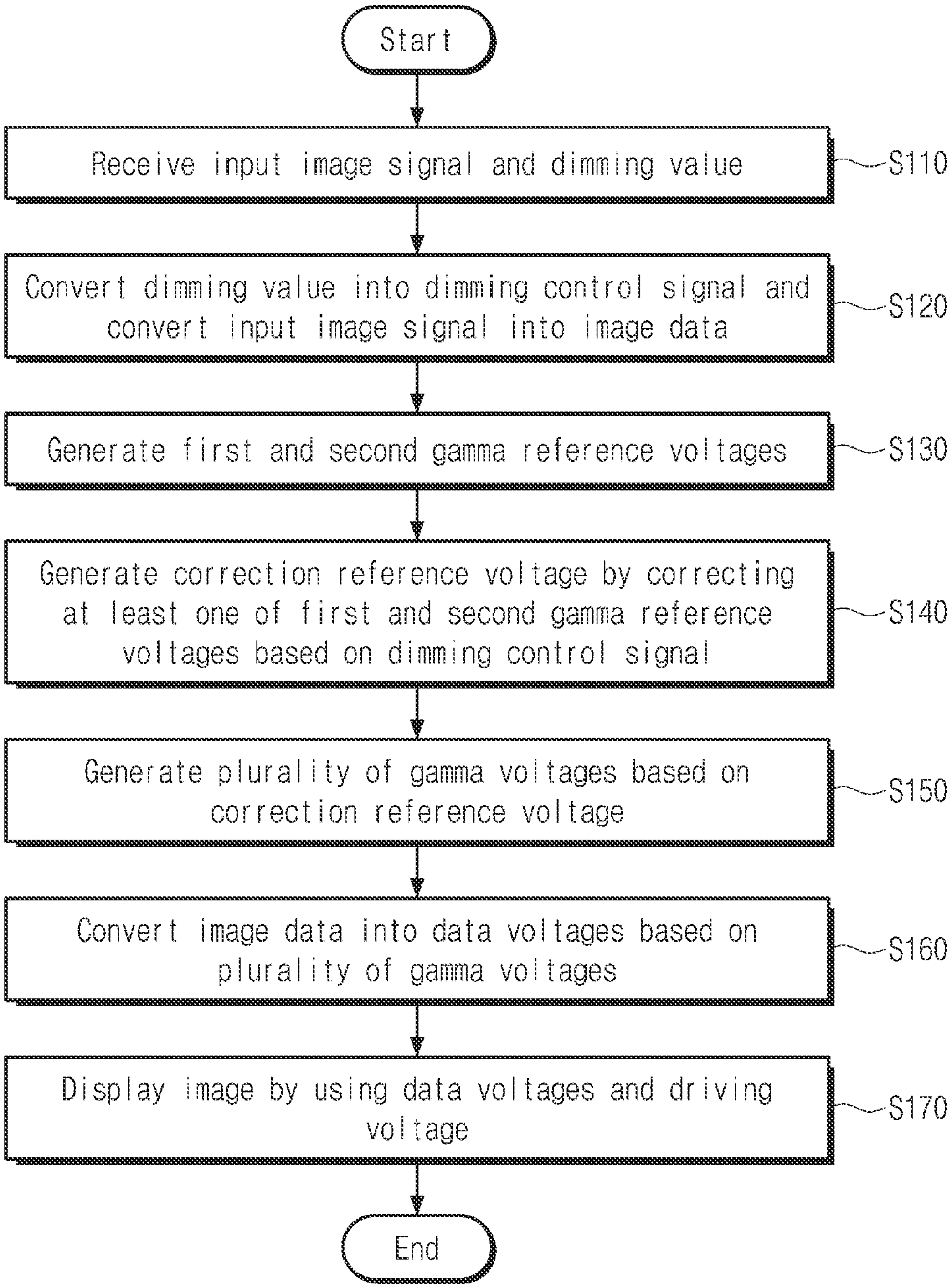
FIG. 10 is a flowchart illustrating a driving method of a display device, according to an embodiment of the present disclosure.

FIG. 10 is a flowchart illustrating a driving method of a display device, according to an embodiment of the present disclosure.

Referring to FIGS. 1, 2, and 10, in a driving method of the display device DD according to an embodiment of the present disclosure, the display device DD receives the input image signal RGB and the dimming value DBV through the controller 100 (S110).

The controller 100 converts the dimming value DBV into the dimming control signal S_DBV and converts the input image signal RGB into the image data I_data (S120).

Afterward, the display device DD generates the first and second gamma reference voltages Vref_H and Vref_L by using the reference voltage generator 250 (S130). The reference voltage generator 250 receives the dimming control signal S_DBV from the controller 100 and outputs the correction reference voltage C_Vref_L by correcting at least one of the first and second gamma reference voltages Vref_H and Vref_L based on the dimming control signal S_DBV (S140). According to an embodiment of the present disclosure, the reference voltage generator 250 may correct the second gamma reference voltage Vref_L to the correction reference voltage C_Vref_L.

Afterward, the display device DD generates the plurality of gamma voltages VGMA1 to VGMAk based on the correction reference voltage C_Vref_L by using the gamma voltage generator 201 (S150). According to an embodiment of the present disclosure, the gamma voltage generator 201 may receive the first gamma reference voltage Vref_H and the correction reference voltage C_Vref_L from the reference voltage generator 250 and may generate the plurality of gamma voltages VGMA1 to VGMAk based on the first gamma reference voltage Vref_H and the correction reference voltage C_Vref_L.

The display device DD converts the image data I_data into the data voltages DV1 to DVm based on the plurality of gamma voltages VGMA1 to VGMAk through the D/A converter 202 (S160).

Afterward, the display device DD may display an image by using the display panel DP that receives the data voltages DV1 to DVm and the first driving voltage ELVDD (S170).

Figure 11:
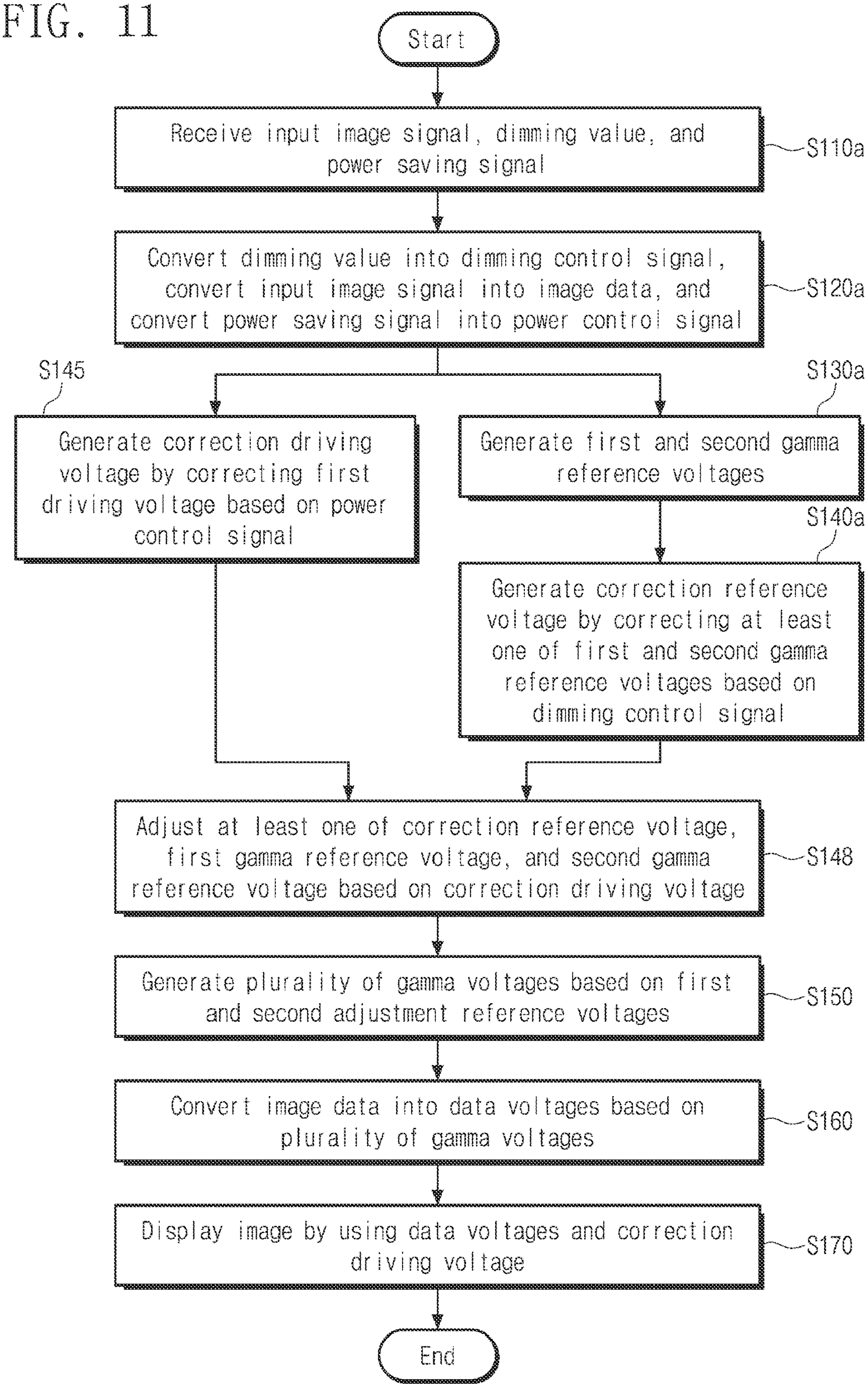
FIG. 11 is a flowchart illustrating a driving method of a display device, according to an embodiment of the present disclosure.

FIG. 11 is a flowchart illustrating a driving method of a display device, according to an embodiment of the present disclosure.

Referring to FIGS. 1, 7, 9, and 11, in a driving method of the display device DD according to an embodiment of the present disclosure, the display device DD receives the input image signal RGB, the dimming value DBV, and the power saving signal PSV through the controller 100*a* (S110*a*).

The controller 100*a* converts the dimming value DBV into the dimming control signal S_DBV and converts the input image signal RGB into the image data I_data (S120*a*). The controller 100*a* may further convert the power saving signal PSV into the power control signal S_PSV (S120*a*).

The display device DD may correct the first driving voltage ELVDD to the correction driving voltage C_ELVDD by using the panel voltage generator 400*a* that receives the power control signal S_PSV (S145). The panel voltage generator 400*a* may generate the correction driving voltage C_ELVDD based on the power control signal S_PSV.

Afterward, the display device DD generates the first and second gamma reference voltages Vref_H and Vref_L by using the reference voltage generator 250 (S130*a*). The reference voltage generator 250 receives the dimming control signal S_DBV from the controller 100*a* and outputs the correction reference voltage C_Vref_L by correcting at least one of the first and second gamma reference voltages Vref_H and Vref_L based on the dimming control signal S_DBV (S140*a*). According to an embodiment of the present disclosure, the reference voltage generator 250 may correct the second gamma reference voltage Vref_L to the correction reference voltage C_Vref_L.

The display device DD may adjust at least one (e.g., the first gamma reference voltage Vref_H) of the correction reference voltage C_Vref_L, the first gamma reference voltage Vref_H, and the second gamma reference voltage Vref_L based on the correction driving voltage C_ELVDD by using the voltage adjustment unit 254 to generate the first and second adjustment reference voltages A_Vref_H and A_Vref_L (S148).

Afterward, the display device DD generates the plurality of gamma voltages VGMA1 to VGMAk based on the first and second adjustment reference voltages A_Vref_H and A_Vref_L by using the gamma voltage generator 201 (S150). According to an embodiment of the present disclosure, the gamma voltage generator 201 may receive the first gamma reference voltage Vref_H and the correction reference voltage C_Vref_L from the reference voltage generator 250 and may generate the plurality of gamma voltages VGMA1 to VGMAk based on the first gamma reference voltage Vref_H and the correction reference voltage C_Vref_L.

The display device DD converts the image data I_data into the data voltages DV1 to DVm based on the plurality of gamma voltages VGMA1 to VGMAk through the D/A converter 202 (S160).

Afterward, the display device DD may display an image by using the display panel DP that receives the data voltages DV1 to DVm and the correction driving voltage C_ELVDD (S170).

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

According to an embodiment of the present disclosure, a grayscale may be expressed without loss of grayscale even at low luminance by correcting one of the first and second gamma reference voltages depending on a dimming value. Accordingly, the deterioration of display quality during dimming may be reduced.

Moreover, even when a driving voltage is corrected to reduce power consumption, a correction reference voltage may be adjusted by reflecting the corrected driving voltage, thereby preventing grayscale loss due to dimming without affecting the reduction in power consumption.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a controller configured to receive an input image signal and a dimming value, to convert the input image signal into image data and the dimming value into a dimming control signal, and to output the dimming control signal;

a reference voltage generator comprising a voltage generation unit generating a first gamma reference voltage and a second gamma reference voltage, and a voltage correction unit receiving the dimming control signal, outputting a correction reference voltage by correcting the second gamma reference voltage based on the dimming control signal and outputting the first gamma reference voltage without correcting the first reference voltage;

a data driver configured to receive the correction reference voltage, to generate gamma voltages based on the correction reference voltage, to convert the image data into data voltages based on the gamma voltages, and to output the data voltages; and a display panel receiving the data voltages, the display panel including a plurality of pixels.

2. The display device of claim 1, wherein the first gamma reference voltage is a voltage for determining a voltage level for the lowest grayscale among grayscales expressed by using the data voltages, wherein the second gamma reference voltage is a voltage for determining a voltage level for the highest grayscale among the grayscales expressed by using the data voltages.

3. The display device of claim 2, wherein the voltage generation unit generates the first gamma reference voltage and the second gamma reference voltage based on an input voltage.

4. The display device of claim 3, wherein the data driver includes:

a gamma voltage generator configured to receive the first gamma reference voltage and the correction reference voltage and to generate the plurality of gamma voltages based on the first gamma reference voltage and the correction reference voltage; and a D/A converter configured to receive the plurality of gamma voltages from the gamma voltage generator and to convert the image data into the data voltages based on the plurality of gamma voltages.

5. The display device of claim 3, wherein the voltage correction unit corrects the second gamma reference voltage such that a difference between the first gamma reference voltage and the correction reference voltage is reduced as the dimming value decreases.

6. The display device of claim 3, wherein the reference voltage generator further includes:

a first memory including a dimming lookup table that stores a first voltage correction value for the first gamma reference voltage and a second voltage correction value for the second gamma reference voltage for each level of the dimming control signal.

7. The display device of claim 1, wherein each of the pixels includes:

a pixel circuit unit configured to receive a corresponding data voltage among the data voltages and to receive a driving voltage; and a light emitting element connected to the pixel circuit unit.

8. The display device of claim 7, wherein the pixel circuit unit includes:

a first transistor connected between a driving voltage line for receiving the driving voltage and the light emitting element;

a second transistor connected between a data line for receiving a data voltage among the data voltages and a first electrode of the first transistor; and a third transistor connected between a second electrode of the first transistor and a gate electrode of the first transistor.

9. The display device of claim 7, further comprising:

a panel voltage generator configured to receive a power control signal and to generate a correction driving voltage by correcting the driving voltage based on the power control signal.

10. The display device of claim 9, wherein the panel voltage generator includes:

a panel voltage generation unit configured to generate the driving voltage; and a driving voltage correction unit configured to receive the driving voltage from the panel voltage generation unit and to correct the driving voltage to the correction driving voltage based on the power control signal.

11. The display device of claim 10, wherein the panel voltage generator further includes:

a second memory including a power lookup table storing power correction values for each level of the power control signal.

12. The display device of claim 10, wherein the reference voltage generator receives the correction driving voltage and adjusts a voltage level of the correction reference voltage based on the correction driving voltage.

13. The display device of claim 12, wherein the first gamma reference voltage is a voltage for determining a voltage level for the lowest grayscale among grayscales expressed by using the data voltages, wherein the second gamma reference voltage is a voltage for determining a voltage level for the highest grayscale among the grayscales expressed by using the data voltages, and wherein the reference voltage generator corrects the second gamma reference voltage to the correction reference voltage.

14. The display device of claim 13, wherein the reference voltage generator includes:

a voltage generation unit configured to generate the first gamma reference voltage and the second gamma reference voltage based on an input voltage; and a voltage correction unit configured to receive the first gamma reference voltage and the second gamma reference voltage from the voltage generation unit and to generate the correction reference voltage by correcting the second gamma reference voltage based on the dimming control signal, and a voltage adjustment unit configured to receive the correction driving voltage, the first gamma reference voltage, and the correction reference voltage and to adjust voltage levels of the first gamma reference voltage and the correction reference voltage based on the correction driving voltage.

15. The display device of claim 14, wherein the voltage correction unit provides the voltage adjustment unit with the first gamma reference voltage without correcting the first gamma reference voltage.

16. The display device of claim 15, wherein the voltage adjustment unit outputs a first adjustment reference voltage by adjusting the voltage level of the first gamma reference voltage by a first adjustment value and outputs a second adjustment reference voltage by adjusting the voltage level of the correction reference voltage by a second adjustment value.

17. The display device of claim 16, wherein the first adjustment value and the second adjustment value have the same level as each other.

18. The display device of claim 15, wherein the voltage correction unit corrects the second gamma reference voltage such that a difference between the first gamma reference voltage and the correction reference voltage is reduced as the dimming value decreases.

19. A driving method of a display device, the method comprising:

receiving an input image signal and a dimming value;

converting the dimming value into a dimming control signal and converting the input image signal into image data;

generating a first gamma reference voltage and a second gamma reference voltage by a voltage generation unit of a reference voltage generator;

outputting a correction reference voltage by correcting the second gamma reference voltage based on the dimming control signal received by a voltage correction unit of the reference voltage generator and outputting the first gamma reference voltage without correcting the first gamma reference voltage by the voltage correction unit;

generating gamma voltages based on the correction reference voltage; and converting the image data into data voltages based on the gamma voltages.

20. The method of claim 19, further comprising:

generating a correction driving voltage by correcting the driving voltage based on a power control signal; and adjusting at least one of the correction reference voltage, the first gamma reference voltage, and the second gamma reference voltage based on the correction driving voltage.

* * * * *